United States Patent
Parikh et al.

(10) Patent No.: US 9,996,682 B2
(45) Date of Patent: Jun. 12, 2018

(54) DETECTING AND PREVENTING ILLICIT USE OF DEVICE

(71) Applicant: Microsoft Technology Licensing, LLC, Redmond, WA (US)

(72) Inventors: Vaibhav Girish Parikh, Bothell, WA (US); Paul Valentin Borza, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 14/695,190

(22) Filed: Apr. 24, 2015

(65) Prior Publication Data

US 2016/0314289 A1    Oct. 27, 2016

(51) Int. Cl.
| | | |
|---|---|---|
| G06F 21/31 | (2013.01) | |
| G06F 21/56 | (2013.01) | |
| G06F 3/0488 | (2013.01) | |
| G06F 21/88 | (2013.01) | |

(52) U.S. Cl.
CPC .......... *G06F 21/316* (2013.01); *G06F 3/0488* (2013.01); *G06F 21/566* (2013.01); *G06F 21/88* (2013.01)

(58) Field of Classification Search
CPC ..... G06F 21/88; G06F 21/316; H04L 63/105; H04W 12/12
USPC .......................................................... 726/18
See application file for complete search history.

(56) References Cited

U.S. PATENT DOCUMENTS

| | | | |
|---|---|---|---|
| 6,542,729 | B1 | 4/2003 | Chmaytelli et al. |
| 7,970,386 | B2 | 6/2011 | Bhat et al. |
| 8,145,561 | B1 | 3/2012 | Zhu |
| 8,615,216 | B2 | 12/2013 | Rajguru |
| 8,655,314 | B1 | 2/2014 | Zang et al. |
| 8,731,519 | B2 * | 5/2014 | Flynn .................... H04W 88/04 370/338 |
| 2007/0016953 | A1 | 1/2007 | Morris et al. |
| 2007/0239604 | A1 | 10/2007 | O'Connell et al. |
| 2008/0209557 | A1 | 8/2008 | Herley et al. |
| 2008/0226069 | A1 | 9/2008 | Tan |
| 2009/0013405 | A1 | 1/2009 | Schipka |
| 2009/0199296 | A1 | 8/2009 | Xie et al. |

(Continued)

FOREIGN PATENT DOCUMENTS

| | | |
|---|---|---|
| WO | 2003094562 A1 | 11/2003 |
| WO | 2010105249 A1 | 9/2010 |

OTHER PUBLICATIONS

Hu, et al., "Smartphone Data Protection Using Mobile Usage Pattern Matching", In Cyber Security Standards, Practices and Industrial Applications: Systems and Methodologies, 23, Retrieved on: Jun. 25, 2014, document dated: 2012, 17 pages.

(Continued)

*Primary Examiner* — Dao Q Ho
(74) *Attorney, Agent, or Firm* — Jeffrey L. Ranck; Ranck IP Law

(57) ABSTRACT

Illicit use of devices, and misappropriation of the data on those devices, may be prevented by detecting patterns of behavior that suggest illicit use, and by taking action when such illicit use is detected. A device may store information that describes suspicious patterns of use, and may also store information that describes normal patterns of use of known legitimate users. If current use of the device matches a suspicious pattern of use, and if the user of the device cannot be confirmed to be a known legitimate user, then action may be taken, such as locking the device's user interface, shutting down the device's communication facilities, issuing a warning message, sending a communication, or any other action.

13 Claims, 4 Drawing Sheets

(56) References Cited

U.S. PATENT DOCUMENTS

| | | | |
|---|---|---|---|
| 2009/0288079 A1* | 11/2009 | Zuber | G06F 21/51 |
| | | | 717/176 |
| 2011/0141276 A1* | 6/2011 | Borghei | H04W 12/08 |
| | | | 348/143 |
| 2012/0290712 A1 | 11/2012 | Walter et al. | |
| 2013/0103944 A1* | 4/2013 | Adams | H04L 12/5895 |
| | | | 713/168 |
| 2014/0009421 A1* | 1/2014 | Lee | G06F 3/041 |
| | | | 345/173 |

OTHER PUBLICATIONS

Grosser, et al., "Detecting Fraud in Mobile Telephony Using Neural Networks", In Proceedings of Innovations in Applied Artificial Intelligence, Lecture Notes in Computer Science vol. 3533, Jun. 22, 2005, 3 pages.

Frank M et al: "Touchalytics: On the Applicability of Touchscreen Input as a Behavioral Biometric for Continuous Authentication" IEEE Transactions on Information Forensics and Security, IEEE,Piscataway, NJ, US, vol. 8, No. 1, Jan. 1, 2013 (Jan. 1, 2013), pp. 136-148, XP011487920, ISSN: 1556-6013, DOI: 10.1109/TIFS.2012.2225-48.

"International Preliminary Report on Patentability Issued in PCT Application No. PCT/US2016/027490", dated May 29, 2017, 7 Pages.

"International Search Report & Written Opinion Issued in PCT Application No. PCT/US2016/027490", dated Jun. 15, 2016, 11 Pages.

"Second Written Opinion Issued in PCT Application No. PCT/US2016/027490", dated Mar. 2, 2017, 6 Pages.

* cited by examiner

DETECTING AND PREVENTING ILLICIT USE OF DEVICE

BACKGROUND

A computing device, such as a tablet, phone, or laptop, provides an opportunity to have one's data stolen. Leaving a phone unattended for even a few seconds gives a thief an opportunity to steal the data stored on the phone. In order to prevent such data loss, people often set passwords or passcodes on their devices; some organizations even require the use of password or passcodes as a condition to allowing the organization's computing systems to be accessed through the device.

Normally, the device has a short timeout such as one minute, after which the password or passcode has to be entered anew. However, data can be stolen and transmitted very quickly, so, in the world of data theft, a minute is effectively an eternity. And imposing a timeout of less than a minute may impose a significant inconvenience for the legitimate user of the device.

SUMMARY

Patterns of device usage that are either unusual for the legitimate user, or that are consistent with data-theft behavior, may be detected in order to guard against data theft on a device. Software on the device monitors the device to determine how the device is being used, and who appears to be using the device. If a use of the device is detected that is consistent with known patterns of data theft, or that is inconsistent with the normal way in which the device is used, or that suggests that the device is being operated by someone other than its usual legitimate user, then action may be taken. The action may include locking the device, issuing a warning, sending an e-mail to the owner of the device, or any other action.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
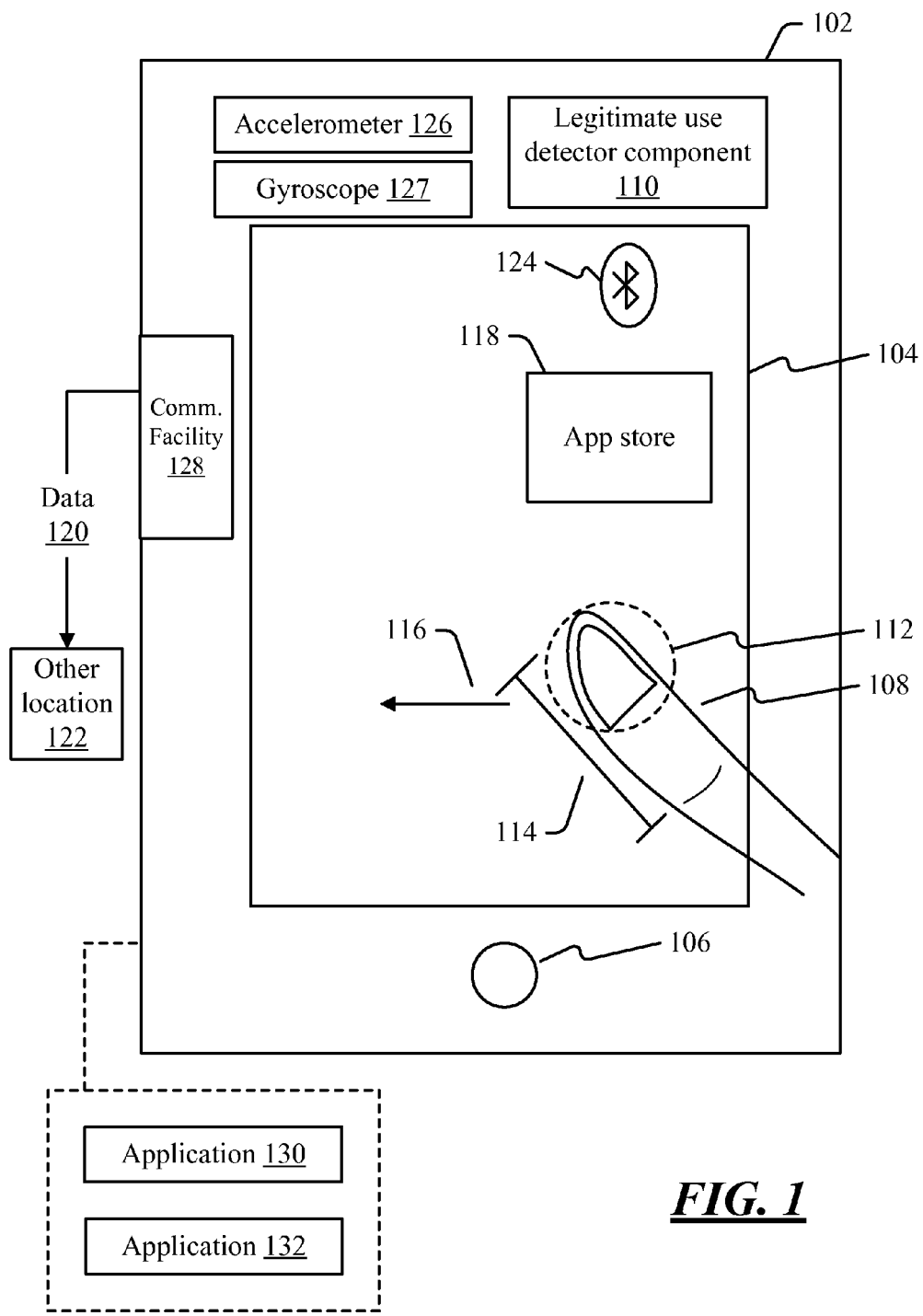
FIG. 1 is a block diagram of an example device on which possible illicit use of the device may be detected.

Computing devices, such as tablets, phones, laptop computers, etc., allow their users to store and access data. The ability to store and access data on the device provides convenience for the user but also provides an opportunity for a thief to steal the data. If the thief holds the device for only a few seconds, the thief can use the device's communications capabilities to transmit data from the device to another location controlled by the thief. Any sort of mischief, from identity theft to invasion of privacy to corporate espionage, can be performed in this manner.

Many users protect their devices with a password, a passcode, or a biometric scan (e.g., a fingerprint scan or iris scan), which has to be entered correctly in order to gain access to the device. In fact, some organizations have security policies that prevent people from using their devices to access the organization's e-mail system, databases, or services unless the device is secured by some protection mechanism, such as one of the options mentioned above. In some cases, the organization's policy may even specify how short of a timeout lock is to be set on the device as a condition for accessing the organization's data. However, as noted above, a thief can steal data (or at least can initiate the stealing of data) with only a few seconds of access to a device, so these protection mechanisms may be ineffective against a thief with sufficient opportunity and motivation.

The subject matter described herein provides a technique for resisting the theft of data on devices, or other misuse of devices. Software on the device monitors the actual current usage of the device, and compares the current usage to behaviors that are generally known to be suspicious, and/or to behaviors that are known to be associated with the legitimate user of the device. If the current behavior is similar to a known suspicious behavior, or if the current behavior differs from patterns that are known to be associated with the legitimate user of the device, then action may be taken. Examples of actions that could be taken include locking the device, issuing a warning message, sending an e-mail to the owner of the device, sending an e-mail to someone in the chain of command of the legitimate owner of the device, or any other action.

In some cases, physical features of the current operator of the device may be used to determine whether the device is being used legitimately. For example, an operator of a device has measurable dimensions (e.g., fingertip size, length of the distal phalanx of the index finger, etc.) that can be measured from the user's normal use of the device, and may also have discernible gesture patterns (e.g., swiping to the left in situations where the user has a choice of direction in which to swipe to accomplish some task, tapping with a particular pressure, tapping with a particular repetition speed, etc.). If the current patterns of usage and/or the measurable dimensions of the user suggest that the device is being used by someone other than its usual legitimate user, this fact may suggest that the device is being used in an unauthorized manner. Since it is possible that a legitimate user handed the device to someone else (e.g., the owner of a phone hands it to a friend to show the friend some photos), the fact that the device is being used by an unknown user may be used in conjunction with the nature of the use to determine whether the device is being used illicitly, and to determine what action is to be taken.

It is noted that guarding against device misuse by detecting illicit behavior, rather than by insisting that the user continually enter and re-enter passwords or provide biometric information, has a physical effect on the usage of the device: it reduces the need for user interaction with the device. This reduced need for user interaction reduces wear-and-tear on the device, reduces user fatigue, and—inasmuch as the screen-based user interface on a device is a significant power draw—may reduce power consumption by the device.

Turning now the drawings. FIG. 1 shows an example device on which possible illicit use of the device may be detected. In this example, device 102 comprises a touch screen 104, and a button 106, which form part of the user interface of device 102. Touch screen 104 allows the device to communicate visually with the user, and also allows the device to receive input from the user. Device 102 may have various application programs that are store on, and run on, device 102; two such applications 130 and 132 are shown by way of example. A user uses finger 108 to provide input to device 102 through touch screen 104. The user may also use finger 108 to operate button 106. Device 102 may comprise legitimate use decision component 110 (which may take the form of hardware and/or software), which monitors use of device 102 and determines whether the current use of the device is legitimate. Device 102 may also have an accelerometer 126, which measures the acceleration of the device, and gyroscope 127, which is used to determine the orientation of the device. It is noted that device 102, as depicted in FIG. 1, resembles a smart phone or tablet device, although the techniques shown herein may be applied to a desktop computer, a laptop computer, the on-board computer for a car, or any other type of device.

Various aspects of usage of device 102 may suggest whether use of the device is legitimate or illegitimate. A non-exhaustive set of such aspects is shown in FIG. 1. (Other examples of legitimate and illegitimate use are shown in subsequent figures and are discussed below; it will be understood that the legitimate and/or illegitimate use of a device may take various forms, and the examples contained herein are not intended to be exhaustive or limiting).

A user interacts with device 102 with a finger. Each user's finger has a fingertip 112 which has a measurable size. Additionally, each user's finger has a distal phalanx 114 (the bone from the end of the finger to the first knuckle), and that distal phalanx has a length. The size of the fingertip and the length of the distal phalanx can be measured through the user's interaction with touch screen 104, and this fact provides one way in which component 110 can determine whether the current user is the known legitimate user. Additionally, a user may have certain swipe patterns—e.g., a particular user may tend to swipe to the left in a particular situation (indicated by arrow 116), in which the user has a choice of which direction to swipe. The choice typically made by the known legitimate user may provide a basis for component 110 to understand whether the current user of the device is a known legitimate user (e.g., if the known legitimate user normally swipes left in a particular situation and the current user is swiping right in that same situation, that fact may suggest the device is not being operated by the known legitimate user). Thus, finger measurements and swipe direction are non-exhaustive examples of information that component 110 can use to determine which user is presently operating the device.

There are many situations in which it is legitimate for someone other than the known user to be operating a device—e.g., where the known user hands the device to someone else to view a photo or an e-mail, or the known user lets another person borrow the device to make a phone call etc. Thus, component 110 may also examine patterns of behavior (in addition to the identity of the present user of the device) to determine whether usage is legitimate. For example, one action that may be taken on device 102 is to visit an app store 118 and to download an application. That application may, for example, collect data 120 on device 102 and may use a communication facility 128 of device 102 transmit that data to a location 122 other than device 102. For example, the application may collect a large number of e-mail message, photos, stored passwords, etc., and transmit them to a location other than device 102. Such behavior would be suspicious, in the sense that downloading a new app that quickly collects and transmits data in bulk is not the sort of use that a user is likely to make of his own device, but is consistent with the actions of a data thief. In another example, device 102 may have Bluetooth communication, symbolized in FIG. 1 by icon 124. For device 102 to accept a connection to a new Bluetooth device, and then to quickly starting to transmit data in bulk to that device through Bluetooth communications, might be recognized as unusual behavior for a legitimate user, thereby suggesting an illegitimate use of device 102. If physical measurements of the user, as discussed above, suggest that the current user is a known legitimate user, this fact might weigh in favor of a finding that unusual behavior on the device is legitimate. However, if an unknown user is engaging in suspicious behavior, then this fact may provide a basis to find that device 102 is being used illegitimately, and as a basis to take some action to protect the device. (Examples of such actions are discussed below.)

Figure 2:
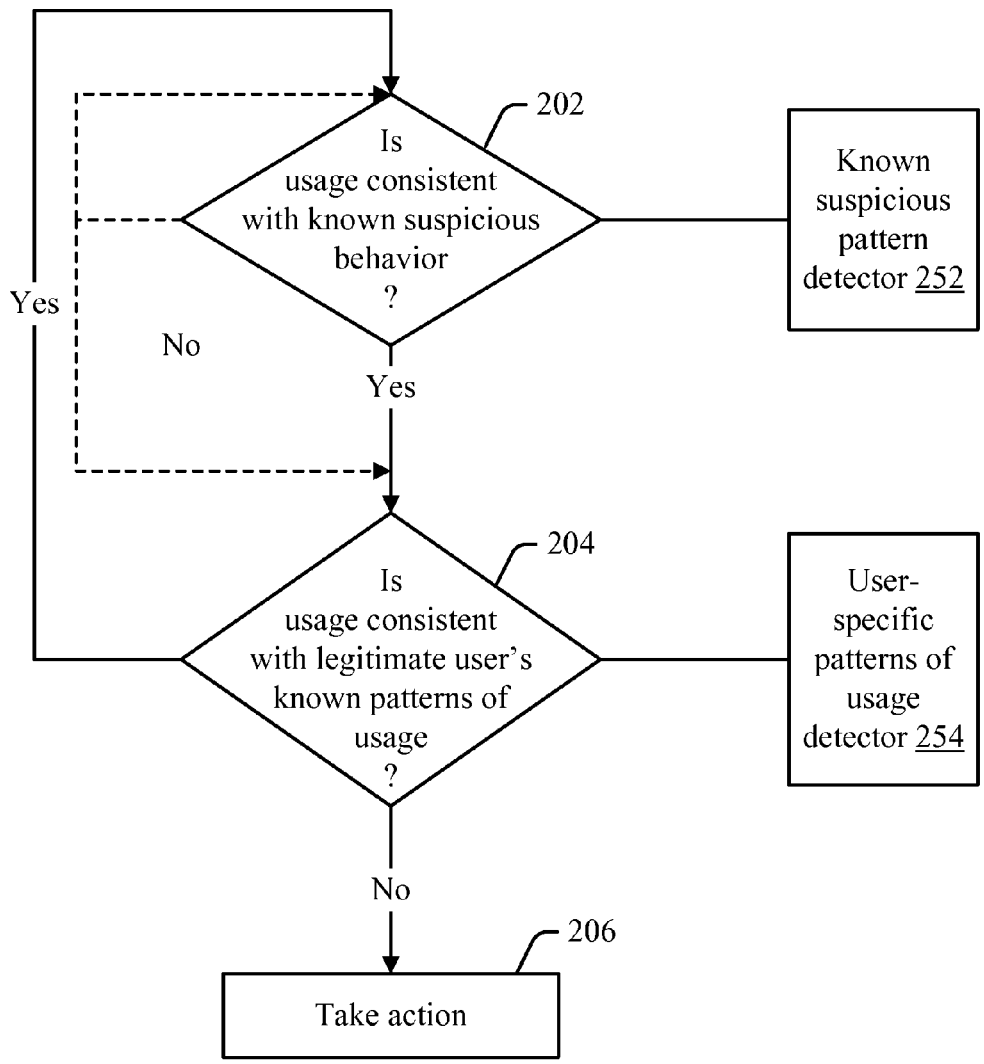
FIG. 2 is a flow diagram of an example process of detecting possible illicit use of a device.

FIG. 2 shows an example process of detecting possible illicit use of a device. At 202, a determination is made as to whether the current usage of the device is consistent with known suspicious behavior. Suspicious behavior, in this context, refers to behavior that is known to be associated with theft of data, making unauthorized payments, gaining unauthorized access to premises, or any other illicit use of a device. The decision as to whether suspicious behavior is occurring may be made using a known suspicious pattern detector 252, which is described in detail below in connection with FIG. 3. If current usage is not consistent with any known suspicious behavior, then the process may either return to 202 to continue monitoring usage of the device, or may proceed to 204 to determine whether current usage is consistent with a legitimate user's known patterns of usage.

At 204, a determination is made as to whether current usage is consistent with a legitimate user's known patterns of usage. The known legitimate user(s) of a device may have established patterns of using the device in particular ways, and the decision made at 204 determines whether the current usage of the device is inconsistent with these known usage patterns, thereby tending to suggest that the current user is not one of the legitimate users. For example, a legitimate user may have a habit of swiping across the screen in a particular direction, or tapping with a particular pressure, or using certain applications in a particular way and with a particular speed, etc. Use of the device in some way that does not match these patterns may suggest that the device is being used by someone who is not one of the device's legitimate users. The decision as to whether behavior is consistent with the legitimate user's known patterns of usage may be made using a user-specific patterns of usage detector 254, which is discussed in detail below in connection with FIG. 3. If the behavior is consistent with a legitimate user's known usage patterns, then the process may conclude that there is no danger to the device, and may therefore cycle back to 202 to continue monitoring usage of the device. If the behavior is not consistent with a legitimate user's known usage patterns, then the process may proceed to 206 to take action. Examples of actions that may be taken are shown in FIG. 4 and are discussed below.

It is noted that the subject matter herein allows for the use of decision block 202, or decision block 204, or both of these decision blocks. When both decision blocks are used, they may be used in any order. In one example, the device first attempts to detect known suspicious behavior (block 202) and then—after finding that suspicious behavior is occurring—checks whether the current user appears to be a known legitimate user (block 204) as a way of possibly vindicating the suspicious behavior. In such an example, block 202 is carried out, and the process proceeds to block 204 only if a block 202 results in a "yes" decision. In another example, the device attempts to detect whether it is being used by an unknown user (block 204), and then—upon finding that the current user is unknown—checks whether the user's behavior with the device is suspicious (block 202). In another example, the device checks either for known suspicious behavior (block 202), or for an unknown user (block 204), but not for both. In another example, the device checks for both suspicious behavior and for an unknown user, and then determines whether the device is being used illicitly based on some combination of these factors. It is noted that detecting suspicious behavior at 202, and then attempting to explain the behavior as benign by determining that the current user of the device is a known legitimate user at 204, may help to prevent the device from taking protective against its own legitimate user.

At 206, the process may take action to protect the device from illicit use. Examples of the actions that may be taken are shown in FIG. 4, and are discussed below.

Figure 3:
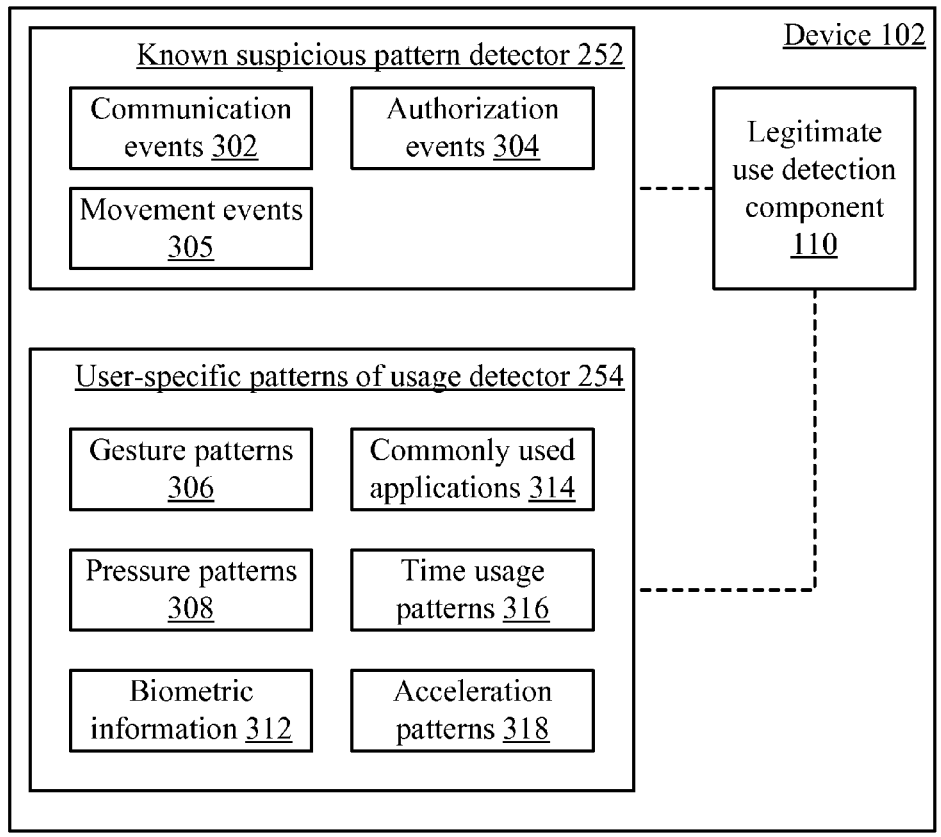
FIG. 3 is a block diagram of example detectors that may be used to determine whether usage of a device is illicit.
Figure 4:
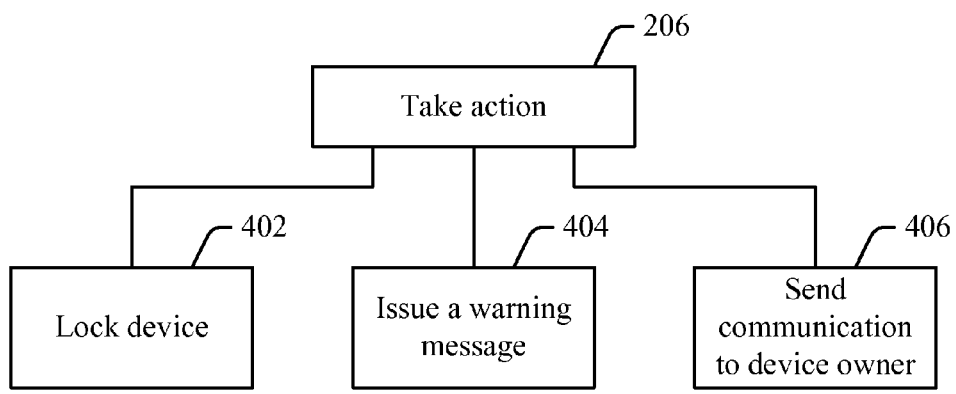
FIG. 4 is a block diagram of example actions that may be taken when a device determines that it is being used illicitly.

FIG. 3 shows example detectors that may be used to determine whether a behavior is suspicious, or whether the behavior is inconsistent with use by a device's legitimate user(s). As noted above in connection with FIG. 1, device 102 may have a legitimate use detection component 110. Legitimate use detection component may be implemented either as a hardware component, a software component, or any combination thereof. Legitimate use detection component may make use of one or more detectors. Examples of these detectors include known suspicious pattern detector 252 and user-specific patterns of usage detector 254.

Known suspicious pattern detector 252 may comprise data that represents suspicious communication events 302, data that represents suspicious authorization events 304, and/or data that represent movement events 305. Suspicious communication events 302 are events that suggest that stolen data is being collected from device 102 and communicated to some other location controlled by the thief. For example, a legitimate user might open an e-mail, respond to the e-mail, open another e-mail, with these actions being spread out over a few minutes. A thief, on the other hand, might open an e-mail application and then quickly forward thirty days worth of e-mail to another address. Such bulk forwarding is an example of a suspicious communication event. In general, certain categories of data tend to be transmitted at the user's direction at a certain rate—e.g., some quantity of data per some unit of time. The normal quantities of data and time are generally pre-determined for each category of data. Transmitting more than the pre-determined quantity of data in that category in the pre-determined amount of time for that category of data may constitute suspicious behavior. In this context, e-mail is an example of a category of data. Other categories of data may include text documents, notes, messages, spreadsheets, or any other type of data.

Another example of a suspicious communication event is collecting credit card numbers or other private data from the device, and then communicating this data to another location, e.g., using the device's WiFi, cellular, or Bluetooth communication capabilities. Another example of a suspicious communication event would be downloading and installing an application that is known to be used by data thieves. These are a few examples of suspicious communication events, which are not intended to be exhaustive. In general, events that involve communication between a device and another entity and that are unlikely to be performed by legitimate users are suspicious communication events. Such events may have characteristics such as communicating much more data in a short period of time than a legitimate user would normally communicate, downloading an application that is often used to facilitate data theft (where such an application is an example of a "thief tool"), or communicating private data that would normally remain on the device.

Suspicious authorization events 304 are events in which a user grants authorization that tend to facilitate data theft. For example, signing into a site that is known to be used by data thieves, or installing an application known to be used by thieves on the legitimate user's Facebook page, are examples of suspicious authorization events. Other examples of suspicious authorization events may include signing into the device under a new identity. There are many possible suspicious authorization events, and this list is not intended to be exhaustive.

Suspicious movement events 305 include movement of a device a distance that is large enough to raise suspicion, or to a location that raises suspicion. For example, a data thief might want to move a device a large distance away from the site of the theft very quickly so that the true owner cannot come back and reclaim the device, or might move the device to a location in which it is difficult to find, such as to an abandoned warehouse. Detection of movement may be made using accelerometer 126 (shown in FIG. 1), or using location service or position-detecting components of the device (where such location services or position-detecting components may be used with permission of the user, in order to preserve the user's legitimate interest in privacy). Such movement events might raise suspicion that the device is being used in an unauthorized or illegitimate way.

User-specific patterns of usage detector 254 may comprise data that represents various aspects of a legitimate user's normal usage. These data may represent gesture patterns 306, pressure patterns 308, biometric information 312, commonly-used application 314, time usage patterns 316, and acceleration patterns 318. These are some example usage patterns, and the list is not intended to be exhaustive. Gesture patterns 306 may represent the ways in which a user tends to use gestures on touch components of the device (e.g., touch screens, touch pads, etc.), where these gesture patterns may include the direction in which the user swipes in a particular situation, the shapes that the user makes when gesturing, the lengths of linear gestures, the radii of circular gestures, etc. Pressure patterns 308 may represent the amount of pressure that the user applies when holding the device, when tapping on the screen as part of a gesture, etc. Biometric information 312 may represent any aspect of a user that can be measured, such as the temperature of the user's hand, the size of the user's finger, the length of a phalanx on the user's finger, the user's fingerprint, the user's iris pattern, etc. Commonly-used applications 314 may represent the set of applications that a particular user typically uses on the device, or the order in which the user switches from one application to another (e.g., if it is common for the user to open the mail application, then the Facebook application, than the messaging application, in that order, that fact may be included among the data on commonly-used applications 314). Time usage patterns 316 represent how long a user typically uses a particular application for, or the pace at which a user uses an application. For example, if a user typically uses Facebook for thirty seconds at a time, or reads each e-mail for an average of forty-five seconds, this fact may be recorded among time usage patterns 316. Acceleration patterns 318 represent patterns of acceleration on the device (as measured through accelerometer 126, shown in FIG. 1). Since different people move in different ways, acceleration patterns 318 may be specific to a particular user, and thus provide a pattern through which a particular user of the device can be identified. It is noted that time usage patterns 316 are usage patterns associated with users, while gesture patterns 306, pressure patterns 308, biometric information 312, time usage patterns 316, and accelerometer patterns 318 are physical features of users which can be measured based on the ways that those users use a device.

FIG. 4 shows examples of actions that may be taken when a device determines that it is being used illicitly. Action 206 is the action shown in FIG. 2. Boxes 402, 404, and 406 show some non-limiting examples of action 206. In one example (box 402), the action taken upon discovering that a device is being used illicitly is to lock the device to prevent any further use of the device. Locking the device may include preventing use of the user interface, but may also include disabling network communication, disabling Bluetooth communications, disabling any wired port such as a Universal Serial Bus (USB) port, or any other action that prevents the device from interacting with the world. In another example (box 404), the action taken is to issue a warning message. For example, the device might display an on-screen message stating that the device is being misused, asking the user to re-authenticate (e.g., by entering a password, providing a fingerprint, providing an iris scan, etc.), or notifying the user that the device will be locked within some amount of time. In another example (box 406), a communication may be sent to the device owner or to another party. For example, an e-mail or text message may be sent to the device owner, or to the device owner's supervisor, or to a technology administrator within the device owner's organization, stating that the device appears to be the subject of misuse.

The actions shown in boxes 402-406 are examples of actions that may be taken, and are not intended to be exhaustive.

Figure 5:
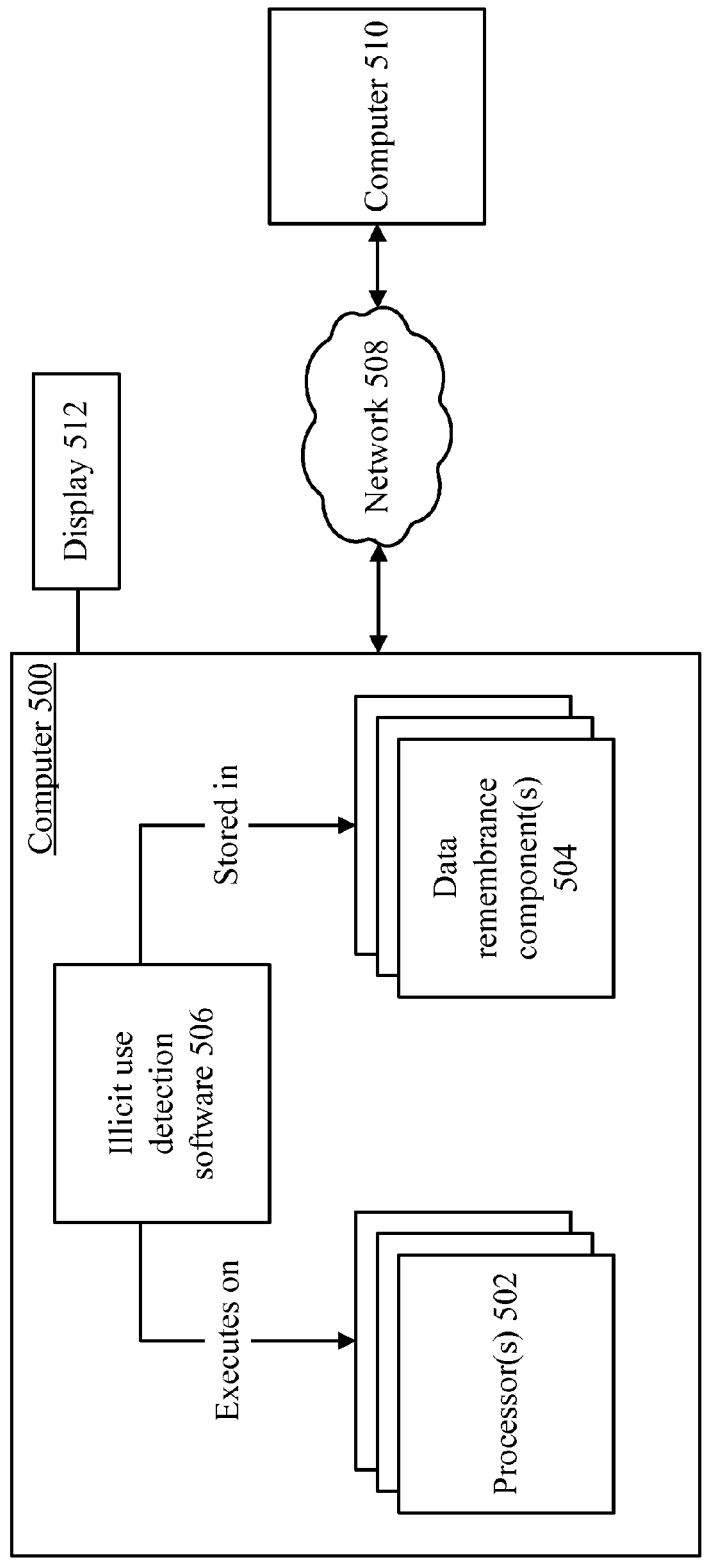
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is illicit use detection software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable media, regardless of whether all of the instructions happen to be on the same medium.

The term "computer-readable media" does not include signals per se; nor does it include information that exists solely as a propagating signal. It is noted that there is a distinction between media on which signals are "stored" (which may be referred to as "storage media"), and—in contradistinction—media that exclusively transmit propagating signals without storing the data that the signals represent. DVDs, flash memory, magnetic disks, etc., are examples of storage media. On the other hand, the fleeting, momentary physical state that a wire or fiber has at the instant that it is transmitting a signal is an example of a signal medium. (Wires and fibers can be part of storage media that store information durably, but information that exists only as the fleeting excitation of electrons in a wire, or only as the pulse of photons in a fiber, constitutes a signal.) It will be understood that, if the claims herein refer to media that carry information exclusively in the form of a propagating signal, and not in any type of durable storage, such claims will use the term "signal" to characterize the medium or media (e.g., "signal computer-readable media", or "signal device-readable media"). Unless a claim explicitly uses the term "signal" to characterize the medium or media, such claim shall not be understood to describe information that exists solely as a propagating signal or solely as a signal per se. Additionally, it is noted that "hardware media" or "tangible media" include devices such as RAMs, ROMs, flash memories, and disks that exist in physical, tangible form, and that store information durably; such "hardware media" or "tangible media" are not signals per se, are not propagating signals, and these terms do not refer media in which information exists exclusively as a propagating signal. Moreover, "storage media" are media that store information. The term "storage" is used to denote the durable retention of data. For the purpose of the subject matter herein, information that exists only in the form of propagating signals is not considered to be "durably" retained. Therefore, "storage media" include disks, RAMs, ROMs, etc., but does not include information that exists only in the form of a propagating signal because such information is not "stored."

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

In one example, the subject matter herein may take the form of a storage medium that is readable by a device, that stores executable instructions to secure said device, where the executable instructions, when executed by said device, cause the device to perform acts comprising: detecting that an application on the device has been used in a way that is consistent with a known pattern of suspicious behavior or than an application, which is in a category of applications not previously used by an authorized user of said device, has been downloaded to said device; and in response to the detecting act, locking a user interface to prevent continued user interaction with the device, or disabling a communication facility of the device to prevent the device from communicating with devices outside of the device. The acts may further comprise using usage patterns of one or more legitimate users of the device, or physical features of the one or more legitimate users of the device, to determine that a current user of the device is not any of the one or more legitimate users of the device. The physical features of the one or more legitimate users may comprise gesture patterns that the one or more legitimate users use to provide input to a touch component of said device. Or, the physical features of the one or more legitimate users may comprise biometrics of the one or more legitimate users. The usage patterns of the one or more legitimate users may comprise a list of applications commonly used by the one or more legitimate users. There may be data on the device that falls into a particular category, and the known pattern of suspicious behavior may comprise communication of a pre-determined quantity of the data in less than a pre-determined amount of time. Or, the known pattern of suspicious behavior comprising authorizing a component, which has been pre-identified as a thief tool, to access data on the device.

In another example, the subject matter herein may take the form of a method of securing a device, where the method comprises first detecting that an application on the device has been used in a way that is consistent with a known pattern of suspicious behavior, second detecting that the device is being handled in a way that is inconsistent with pressure patterns or accelerometer patterns of known legitimate users of the device, and in response to the first detecting act and the second detecting act, taking an action to protect the device from unauthorized use. The action may comprise locking a user interface of the device to prevent further user interaction with the device. Or, the action may comprise issuing a warning message on the device, the warning message stating that the device is being misused. Or, the action may comprise issuing a message that asks a current user of the device to re-authenticate as a condition for continued usage of the device. Or, the action may comprise sending an e-mail to a legitimate user of the device, to an administrator of the device, or to a supervisor of a legitimate user of the device, stating that suspected misuse of the device is presently occurring. In one example, an application is being used on the device, and the acts further comprise third detecting that the application is being used in a way that is inconsistent with time usage patterns of known legitimate users of the device, where the action is taken in response to the first detecting, the second detecting, and the third detecting acts. In another example, the acts comprise third detecting that an application is being used on the device that has not been used by any known legitimate users of the device, the action being taken in response to the first detecting act, the second detecting act, and the third detecting act.

In another example, the subject matter herein may take the form of a device that comprises a data remembrance component, a processor, and a legitimate use decision component that is stored in the data remembrance component, that executes on the processor, that detects that the device is being used in a manner that is consistent with illicit use of the device and that the device is being used in a manner that is inconsistent with usage by any of one or more known legitimate users of said device, where the legitimate use decision component takes an action to protect the device from further illicit use. The illicit use may comprising theft of a particular type of data stored on the device, where the manner in which the device is being used comprises communication of a quantity of the data in less time than would normally be used to communicate data of that type. Or, the illicit use may comprise authorizing an application that is known to be a thief tool for use on the device. Or, the illicit use may comprise using the device to access an online service account of a legitimate user of the device and authorizing an application, that is known to be a thief tool, to use data of the legitimate user on said online service. Or, the illicit use may comprise forwarding more than a pre-determined quantity of e-mail stored on the device to a location outside of the device. The device may comprise communication component that communicates data between the device and the world outside of the device, where the action to protect the device comprises disabling the communication component.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-readable medium having executable instructions stored thereon, that when executed, causes a device to perform acts comprising:
  detecting an event on the device that is consistent with a known pattern of suspicious behavior comprising at least one of:
    that a first application on the device has been used in a way that is consistent with a known pattern of suspicious behavior; and
    that a second application, which is in a category of applications not previously used by an authorized user of the device, has been downloaded to said device;
  detecting a usage pattern of the device comprising:
    a gesture pattern comprising one or more of:
      a swipe direction;
      a shape of a gesture;
      a length of a linear gesture; and
      a radius of a circular gesture; and
    a pressure pattern comprising an amount of pressure a legitimate user applies during an operation;
    responsive to the detected event, checking the detected pattern against legitimate users' known usage pattern; and responsive to determining that the detected usage pattern is not consistent with a legitimate user's known usage pattern, locking a user interface to prevent continued user interaction with said device, or disabling a communication facility of said device to prevent said device from communicating with devices outside of said device.

2. The computer-readable medium of claim 1, said acts further comprising:
    detecting a physical feature of a user of the device;
    responsive to the detected event, further checking the physical feature of the user of the device against a legitimate user's known physical feature;
    wherein the locking or disabling is performed based on the detected event, the detected pattern and the detected physical feature.

3. The computer-readable medium of claim 2, said physical feature comprising biometrics of the user.

4. The computer-readable medium of claim 1, the usage pattern comprising a list of applications commonly used by said one or more legitimate users.

5. The computer-readable medium of claim 1, there being data on said device that falls into a particular category, the event comprising communication of a pre-determined quantity of said data off of the device in less than a pre-determined amount of time.

6. The computer-readable medium of claim 1, the event comprising authorizing a component, which has been pre-identified as a thief tool, to access data on said device.

7. A device comprising:
    a processor and executable instructions stored on a computer-readable medium that, when executed, cause the processor to perform operations comprising:
    detecting whether the device is being used in a manner that is consistent with illicit use of said device, comprising detecting at least one of:
        a suspicious communication event; and
        a suspicious authorization event;
    detecting a usage pattern of the device comprising:
        a gesture pattern comprising one or more of:
            a swipe direction;
            a shape of a gesture;
            a length of a linear gesture; and
            a radius of a circular gesture; and
        a pressure pattern comprising an amount of pressure a legitimate user applies during an operation;
    detecting a physical feature of a user of the device; and
    responsive to detecting that the device is being used in a manner that is consistent with illicit use of the device, checking whether the detected usage pattern does not correspond to a legitimate user, and whether the physical feature does not correspond to a legitimate user;
    responsive to determining that the detected usage pattern does not correspond to a legitimate user or to determining that the detected physical feature does not correspond to a legitimate user, taking an action to protect the device from further illicit use;
    responsive to determining that the detected usage pattern does correspond to a legitimate user or to determining that the detected physical feature does correspond to a legitimate user, taking no action to protect the device from further illicit use.

8. The device of claim 7, wherein the suspicious communication event comprises:
    detecting whether a quantity of a type of data is transmitted in less time than would normally be used to communicate data of the type; and
    responsive to detecting the quantity of the type of data transmitted in less time than would normally be used, declaring a suspicious communication event comprising theft of the type of data.

9. The device of claim 7, wherein the suspicious authorization event is detected by identifying authorization of an application that is known to be a thief tool for use on said device.

10. The device of claim 7, comprising:
    detecting both the suspicious communication event and the suspicious authorization event;
    wherein the suspicious communication event comprises identifying using said device to access an online service account of a legitimate user of said device and
    wherein the suspicious authorization event comprises authorizing an application, that is known to be a thief tool, to use data of said legitimate user on said online service.

11. The device of claim 7, wherein the suspicious communication event comprises forwarding more than a pre-determined quantity of e-mail stored on said device to a location outside of said device.

12. The device of claim 7, said device comprising a communication component that communicates data between said device and the world outside of said device, said action to protect said device comprising disabling said communication component.

13. The device of claim 7 wherein the gesture pattern comprises two or more of:
    a swipe direction;
    a shape of a gesture;
    a length of a linear gesture; and
    a radius of a circular gesture.

* * * * *